United States Patent [19]

Rostagno et al.

[11] 4,394,395
[45] Jul. 19, 1983

[54] PROCESS FOR THE PRODUCTION OF A MOLDED FOOD PRODUCT BY SINTERING

[75] Inventors: Walter Rostagno, La Tour-de-Peilz; Alfred Morand, Blonay, both of Switzerland

[73] Assignee: Societe d'Assistance Technique pour Produits Nestle S.A., Lausanne, Switzerland

[21] Appl. No.: 310,744

[22] Filed: Oct. 13, 1981

[30] Foreign Application Priority Data

Oct. 31, 1980 [CH] Switzerland ............... 8114/80

[51] Int. Cl.³ .................... A23P 1/00; A23C 9/18; A23F 5/38; A23G 3/00
[52] U.S. Cl. .................... 426/285; 426/453; 426/454; 426/468; 426/512; 426/104; 426/306; 426/93
[58] Field of Search ........... 426/285, 454, 468, 465, 426/512, 520, 104.93, 453, 306

[56] References Cited

U.S. PATENT DOCUMENTS

| | | | |
|---|---|---|---|
| 996,289 | 6/1911 | Smith | 426/468 |
| 2,380,092 | 7/1945 | Weisberg | 426/104 |
| 2,738,277 | 3/1956 | Cryns | 426/468 |
| 2,786,760 | 3/1957 | Bonnafoux | 426/454 |
| 2,807,559 | 9/1957 | Steiner | 426/454 |
| 3,463,641 | 8/1969 | Berardi et al. | 426/512 |
| 3,493,382 | 2/1970 | Ryan et al. | 426/512 |
| 3,598,613 | 8/1971 | Hawley | 426/512 |
| 3,779,772 | 12/1973 | Forkner | 426/454 |
| 4,031,238 | 6/1977 | Reid | 426/454 |
| 4,103,034 | 7/1978 | Ronai | 426/512 |

Primary Examiner—Jeanette M. Hunter
Attorney, Agent, or Firm—Vogt & O'Donnell

[57] ABSTRACT

The invention relates to a process for producing a food product in the form of an individual article, particularly a bar, by sintering a powder-form starting material.

To carry out the process, the powder is introduced into the cells of a mould, lightly compacted in the cells, heat-treated in a furnace for a period and at a temperature such that the individual particles melt at their surface and adhere to one another, after which the articles are removed from their moulds and cooled.

The process is applicable to culinary products and to articles of confectionery or chocolate. The articles obtained may be coated.

8 Claims, 1 Drawing Figure

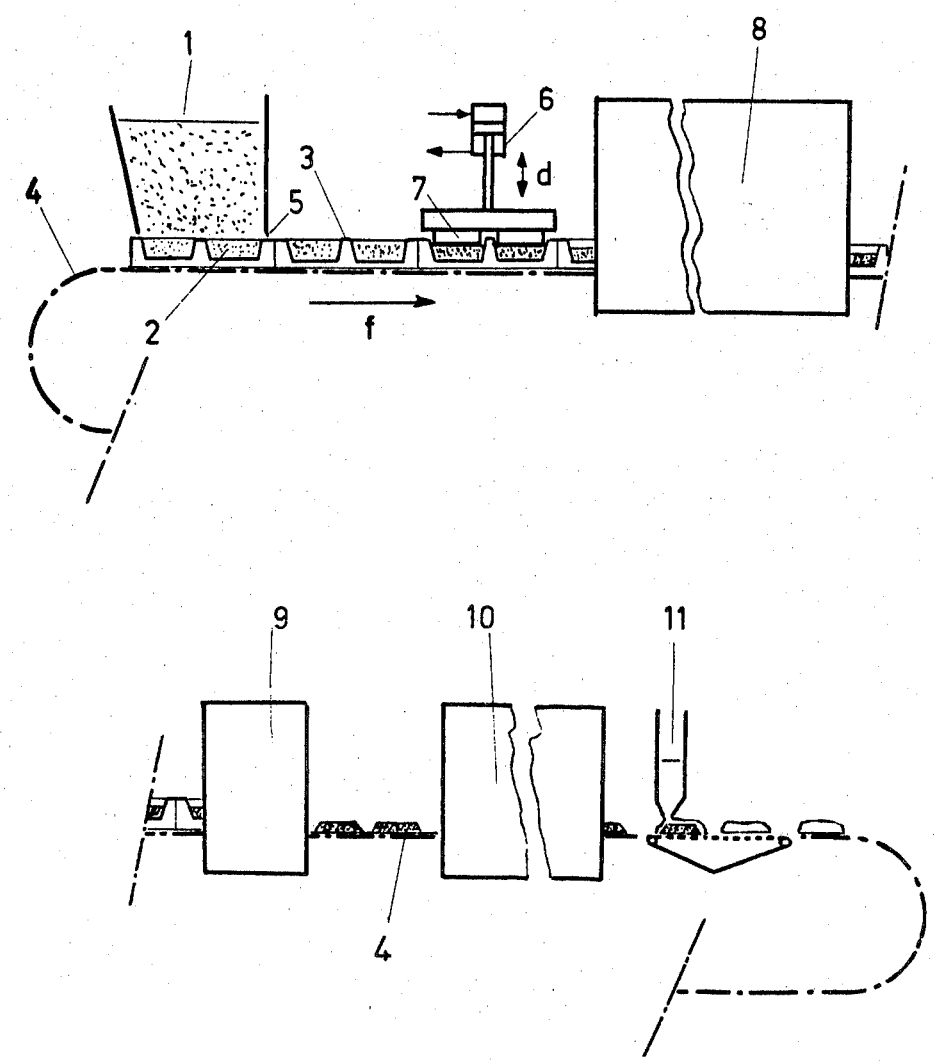
FIGURE

PROCESS FOR THE PRODUCTION OF A MOLDED FOOD PRODUCT BY SINTERING

This invention relates to the production of food products in the form of individual articles, particularly salted culinary products or articles of confectionery or chocolate.

More particularly, the invention relates to the production of compact individual bars from a powder-form product.

Existing products are generally produced by extruding and dividing up a so-called ribbon or by the cold compaction under high pressure of powder or even by the moistening of a powder to convert it into a tacky mass, rolling the mass thus formed, dividing it up into individual portions and then drying it by heat treatment, the heat treatment optionally being carried out in vacuo to cause the product to expand.

These processes are expensive and difficult to carry out:

the end product lacks homogeneity because of the difficulty of uniformly dispersing the liquid,
the economy of the process is poor because the moistening of the powder to convert it into a tacky mass necessitates subsequent evaporation of the water introduced,
the fact that no mould is used means that compaction has to be carried out under a very high pressure to ensure that the individual products retain their shape and are
"self-supporting", this operation frequently being followed by expansion in vacuo to enable the structure to be aerated.

It has now been found that moulded articles, particularly in the form of bars, may be produced from a powder-form starting material by a particularly simple process which does not have any of the disadvantages attending known processes.

The present invention provides a process for the production of a food product in the form of an individual article, particularly a bar, from a powder-form starting material which is capable of being superficially softened under the effect of heat and which has a high degree of fluidity, which comprises introducing the powder into the cells of a mould, lightly compacting it in the cells, subjecting the compacted powder to a sintering treatment in a furnace over a period and at a temperature of the product such that the individual particles superficially melt and adhere to one another, removing the articles from the mould and subsequently cooling them.

The constituent particles of the powder should be capable of melting superficially and of fusing to one another so as to form a rigid structure which does not disintegrate after cooling.

In the context of the invention, a "powder having a high level of fluidity" is understood to be a powder of which the constituent particles are dry to the touch and non-tacky and flow freely. The moisture content of a powder such as this is generally its natural equilibrium moisture content at which the product used is normally packed.

Provided that it satisfies the above-mentioned requirements of superficial melting and fluidity, the powder-form starting material may be selected from a wide variety of carbohydrate-containing food-grade materials used either individually or in admixture. The category of culinary products includes for example vegetable, meat and fish extracts, protein hydrolysates, yeast extracts, cheese, milk, cereals, starches, particularly modified starches and dextrins. The starting material may also contain other ingredients such as spices, flavourings, colourants, fats, sugars or salts.

The starting materials for articles of confectionery or chocolate include, for example, fruit extracts, sugars, maltodextrins, cocoa, coffee, chicory, malted cereals, milk and fats. These materials may also contain the ingredients normally used in the production of confectionery and chocolate, such as flavourings, lecithins, boiled sugars, honey, caramel, nougatine, expanded cereals, dried fruit or size-reduced or whole candied fruit.

In general, it is preferred to use predominantly carbohydrate-containing starting materials characterised by a fats content of less than 25% by weight and a moisture content of less than 20% by weight.

The particle size of the powder naturally has a bearing upon the texture of the product. The finished article will be more compact, the finer the powder used. Particles ranging from 0.1 to 3 mm in diameter give satifactory results.

To carry out the process according to the invention, the cells of a mould are filled to the brim with powder and the product is levelled by means of a scraper, the individual cell forming both the mould and the metering unit for the product.

The powder is then compacted by the application of a pressure corresponding to between 1 and 8 kg/cm$^2$ at the level of the product by means of a piston adapted to the cell of the mould. The object of this operation is to bring the individual particles of powder into contact which is necessary for the subsequent roasting operation and the final structure of the product.

Alternatively, the moulds may be vibrated to ensure good contact between the individual particles of powder, this operation replacing the compacting operation.

The following so-called roasting step comprises heating the compacted product for 3 to 10 minutes to a temperature of from 45° to 120° C. in a tunnel furnace. The duration of the treatment and the temperature applied depend upon the volume of powder to be treated, its nature, its composition and its moisture content. The object of this treatment is to place the powder in a state of superficial fusion so that the individual particles melt at their surface and adhere to one another. The temperature of the furnace depends upon the type of apparatus used and is generally in the range from 100° C. to 300° C. During this operation, the product loses all or part of its equilibrium moisture in contrast to the conventional processes in which the product is first moistened and then dried by heat treatment.

For reasons of effectiveness of the process, it is preferred to keep to a thickness of the product of approximately 20 mm to ensure that there is a transfer of heat which gives a product of homogeneous texture.

At the outlet end of the furnace, the products are removed from their moulds by inverting the moulds which are recycled. The articles are then cooled, in particular to a temperature below 25° C. in the case of articles intended to be coated with chocolate.

The coating consists of one or two layers and forms a protective barrier against the penetration of moisture and against fat-induced whitening. The products thus coated are then packed, for example using the flow-pack system.

The accompanying drawing diagrammatically illustrates one example of an installation for continuously carrying out the process according to the invention.

The FIGURE is a simplified diagram of the installation.

As shown in the drawing, the installation comprises a feed hopper 1 which distributes the powder into the cells 2 of moulds 3 fixed to a conveyor belt 4 circulating step-by-step (5 to 15 steps per minute) in the direction of the arrow F. After or during filling, the mould is levelled off by the scraper 5. The moulds are then directed to a compacting press 6 which comprises stamps 7 adapted to the cavities of the mould and which makes a downwardly directed compression movement during the stoppage time of the conveyor in synchronisation with the step-by-step transport of the moulds (arrow d). The moulds travel through a tunnel furnace 8 equipped with one or more heating zones. At the outlet end of the furnace, the product is removed from its mould at the station 9. The moulds are returned to the filling station along a path which has not been shown. The articles removed from their moulds are then cooled in the tunnel 10, subsequently coated at the station 11 and wrapped at a packing station (not shown).

The process according to the invention is illustrated by the following Examples in which the values express ratios by weight.

EXAMPLE 1

A powder containing the following ingredients: cocoa having a fats content of 21%, malted cereals, skimmed milk powder, butter oil, sucrose, lecithin, mineral salts, vitamins, vanillin, and having the following composition:

| | |
|---|---|
| proteins | 13.0 |
| carbohydrates | 69.8 |
| lipids | 10.1 |
| mineral salts | 4.6 |
| water | 2.5 | and the following physical characteristics:

| | |
|---|---|
| particle size (mean diameter) | 0.2 mm |
| apparent specific gravity | 0.4 g/cc | is treated.

This powder is distributed into the moulds and compacted under a pressure of from 1 to 8 kg/cm². The initial thickness of the layer of 17.5 mm is then reduced to 13 mm. The moulds travel through an electrical infrared furnace over a period of 4 minutes, the furnace being kept at 150° C. and being provided with a fan for the removal of steam. The articles are removed from their moulds by inverting the moulds which are returned to the filling station. The articles are then cooled from 70° C. to a temperature below 25° C. over a period of 6 minutes in a tunnel.

The cooled articles are coated in two stages, first with a layer containing the ingredients sucrose, vegetable fats, cocoa powder containing 13% of fats, skimmed milk powder, lecithin and vanillin, this layer representing 50% of the weight of the demoulded article. The article is coated with the liquid layer at 40° C. and cooled in a tunnel to a product temperature of 23.5° C. A second layer is then applied using the same quantity of coating as before heated to 40° C. The end product is cooled to a temperature below 20° C.

Alternatively, the first layer of coating is formed by the above-described coating and the second layer by milk chocolate containing the ingredients sucrose, whole milk powder containing 25% of fats, cocoa butter, chocolate liquor, butter oil, lecithin and vanillin. The coating is at 40° C. during the first stage and at 29° C. during the second stage of the operation. It is also possible to use a double coating of milk chocolate at 29° C. From 0.5 to 1% of sorbitan tristearate is advantageously added as anti-whitening agent to the milk chocolate. A coated bar weighing from 25 to 30 g is thus obtained.

EXAMPLE 2

The procedure of Example 1 is adopted for the production of a coated bar of which the centre is formed by 44.1% of the powder according to Example 1 and by 7.8% of whole roasted nuts, the coating being formed by 48.1% of milk chocolate as in Example 1.

EXAMPLES 3 to 6

The procedure of Example 1 is adopted for the production of the following coated bars:

| Example | | Centre | | Coating |
|---|---|---|---|---|
| 3 | 65% | dried coconut | 29.5% | 35% of milk chocolate as in Example 1 |
| | | sucrose | 29.5% | |
| | | sorbitol syrup | 6% | |
| 4 | 70% | mixture according to Example 3 | 60% | 30% of milk chocolate as in Example |
| | | candied cherries | 10% | |
| 5 | 52.2% | instant coffeee powder | 1.3% | 47.8% of milk chocolate as in Example 1 |
| | | instant chicory powder | 1.1% | |
| | | malt extract powder | 9.5% | |
| | | sucrose | 17.55% | |
| | | whole milk powder containing 25% of fats | 21.35% | |
| | | cocoa powder containing 13% of fats | 1.4% | |
| 6 | 47.6% | skimmed milk powder | 7.6% | 52.4% of milk chocolate as in Example 1 |
| | | glucose syrup containing 40% of dextrin equivalent | 1.9% | |
| | | whole milk powder containing 25% of fats | 26.7% | |
| | | malt extract | 11.4% | |

EXAMPLE 7

The procedure of Example 1 is adopted for the confection of a centre from a powder containing:

| | |
|---|---|
| skimmed milk powder | 30% |
| sucrose | 40% |
| vegetable fats (Biscuitine N(R)) | 10% |
| malt extract | 2% |
| lecithin, salt, citric acid, flavouring | 1% |

| | | -continued | |
|---|---|---|---|
| | water | | 17% |

The centre represents 59.4% of the end product and is coated with 40.6% of a layer of the same milk chocolate as in Example 1.

EXAMPLES 8 to 34

These Examples show that the process according to the invention may be applied with satisfactory results to powders of a variety of origins.

The following Table shows the conditions under which the centres are produced:

| Example No. | Ingredient | Compacting pressure (kg/cm$^2$) | Duration of the furnace treatment (mins) | Furnace temp. (°C.) | Product temp. (°C.) | Roasting results |
|---|---|---|---|---|---|---|
| 8 | malt | 2.5 | 5 | 100 | 68 | good |
| 9 | dextrose | 5 | 5 | 150 | 85 | good |
| 10 | sorbitol | 5 | 5 | 75 | 53 | good |
| 11 | freeze-dried instant coffee | 3.7 | 5 | 120 | 83 | good |
| 12 | Amstar$^{(R)}$ sugar with a moisture content of 1% (Amstar Corp.) | 2.5 | 5 | 150 | 90 | good |
| 13 | Biogerme$^{(R)}$ (Multiforsa AG) | 2.5 | 8 | 150 | 90 | good |
| 14 | Sugar Puffs | 1.3 | 5 | 100 | 62 | good mould release difficult |
| 15 | toffee (skimmed milk + glucose syrup with a dextrose equivalent of 40%) | 2.5 | 5 | 100 | 59 | good |
| 16 | chicory | 2.5 | 10 | 120 | 80 | average |
| 17 | lactose | 3.7 | 10 | 150 | 91 | average |
| 18 | skimmed milk | 3.7 | 10 | 120 | 85 | good |
| 19 | milk containing 25% of fats | 2.5 | 10 | 120 | 87 | average |
| 20 | milk chocolate | 1.3 | 8 | 120 | 97 | good |
| 21 | plain chocolate | 1.3 | 8 | 120 | 96 | good |
| 22 | fruits (fresh) | 2.5 | 5 | 120 | 75 | average |
| 23 | honey | 2.5 | 53 | 75 | 48 | tacky |
| 24 | dry cheese | 2.5 | 10 | 150 | 101 | average |
| 25 | cheese + lactose | 2.5 | 5 | 100 | 72 | average |
| 26 | acidified milk | 2.5 | 10 | 120 | 89 | average |
| 27 | dehydrated pea-ham soup | 3.7 | 8 | 150 | 91 | good |
| 28 | dehydrated tomato soup | 3.7 | 5 | 120 | 72 | good |
| 29 | dehydrated potato (30%) broth | 3.7 | 5 | 150 | 91 | good |
| 30 | dehydrated cereal soup | 3.7 | 5 | 150 | 90 | good |
| 31 | Ovomaltine$^{(R)}$ (Wander AG) | 3.7 | 10 | 150 | 102 | average |
| 32 | Prontovo$^{(R)}$ (Wander AG) | 3.7 | 8 | 150 | 91 | good |
| 33 | Dawamalt$^{(R)}$ (Wander AG) | 3.5 | 5 | 150 | 90 | good |
| 34 | Soya malt$^{(R)}$ (Morga S.A.) | 3.7 | 3 | 130 | 67 | average |

We claim:

1. A process for the production of a food product in the form on an individual article made from a powder-form starting material comprising the steps of:
    (a) introducing a food powder having a particle size of from 0.1 to 3.0 mm and a moisture content of less than 20% by weight into the cells of a mold, said food powder capable of being superficially softened under the effect of heat and having a high level of fluidity;
    (b) lightly compacting the food powder in the cells by applying a pressure on the powder of from 1 to 8 kg/cm$^2$;
    (c) subjecting the compacted powder to a sintering treatment in a furnace for 3 to 10 minutes at a product temperature of from 45° to 120° C. such that the individual particles melt at their surface and adhere to one another to form an individual article;
    (d) removing the articles from the mold; and then
    (e) cooling the articles.

2. A process as claimed in claim 1, wherein the powder has a fat content of less than 25% by weight.

3. A process as claimed in claim 1, wherein the starting material is a culinary product selected from vegetable, meat, fish or yeast extracts, protein hydrolysates, cheese, milk, cereals, starches, modified starches and dextrins.

4. A process as claimed in claim 3, wherein the starting material contains one or more additives selected from spices, flavourings, colourants, fats, sugars and salts.

5. A process as claimed in claim 1, wherein the starting material is a product of the type used in the production of confectionery or chocolate selected from fruit extracts, sugars, maltodextrins, cocoa, coffee, chicory, malted cereals, milk and fats.

6. A process as claimed in claim 5, wherein the starting material contains one or more additives selected from flavourings, lecithins, boiled sugars, honey, caramel, nougatine, expanded cereals, dried fruit and candied fruit.

7. A process as claimed in claim 5 or 6, wherein the starting material contains cocoa, malted cereals, skimmed milk powder, butter oil, sucrose, lecithin, vanillin, mineral salts and vitamins.

8. A process as claimed in claim 1, wherein the article is cooled to a temperature below 25° C. and coated in one or two stages with a chocolate-based coating.

* * * * *